US005529419A

United States Patent [19]

Gebauer

[11] Patent Number: 5,529,419

[45] Date of Patent: Jun. 25, 1996

[54] HIGH VISIBILITY COUPLER FOR FRONT END LOADER

[75] Inventor: Thomas E. Gebauer, Dewitt, Iowa

[73] Assignee: JRB Company, Inc., Adron, Ohio

[21] Appl. No.: 280,338

[22] Filed: Jul. 25, 1994

[51] Int. Cl.[6] .............................. A01B 51/00; E02F 9/00; B66F 11/00

[52] U.S. Cl. ................................ 403/24; 37/468; 172/273

[58] Field of Search ................................ 403/24; 37/468, 37/231; 414/723; 172/275, 273, 272; D15/28, 32

[56] References Cited

U.S. PATENT DOCUMENTS

| | | | |
|---|---|---|---|
| 3,760,883 | 9/1973 | Birk | 37/231 X |
| 4,068,959 | 1/1978 | Pemberton | 172/273 X |
| 4,625,988 | 12/1986 | Witchey et al. | 37/231 X |
| 4,708,579 | 11/1987 | Baird et al. | 414/723 |
| 4,850,789 | 7/1989 | Zimmerman | 414/723 X |
| 5,141,385 | 8/1992 | Tibbatts et al. | 414/723 |
| 5,310,275 | 5/1994 | Lovitt | 37/468 X |
| 5,338,148 | 8/1994 | Rönnblom | 414/723 X |

FOREIGN PATENT DOCUMENTS

| | | | |
|---|---|---|---|
| 278571 | 8/1988 | European Pat. Off. | 37/468 |
| 137533 | 8/1982 | Japan | 37/468 |
| 013835 | 1/1983 | Japan | 37/468 |

*Primary Examiner*—Terry Lee Melius
*Assistant Examiner*—Christopher J. Novosad
*Attorney, Agent, or Firm*—Renner, Kenner, Greive, Bobak, Taylor & Weber

[57] ABSTRACT

A high visibility coupler for front end loader implements that is selectively mountable to the extendable arms of a front end loader and is attachable to implements, such as a fork. The structure of the coupler is such that it has a plurality of parallel lift ribs, that are perpendicularly interconnected by cross ribs to form an open lattice type structure, thereby allowing the operator of the front end loader to easily see and manipulate the fork or other attachment, so that the object to be picked up can be easily and safely engaged.

12 Claims, 2 Drawing Sheets

HIGH VISIBILITY COUPLER FOR FRONT END LOADER

TECHNICAL FIELD

Generally, this invention relates to quick couplers for front end loader implements. Specifically, this invention relates to a quick coupler which has a lattice type structure to provide high visibility of the implement connected thereto.

BACKGROUND OF THE INVENTION

Front end loaders are powered vehicles running on wheels or tracks having hydraulically operated upper and lower pairs of arms extending from the front of the vehicle. The arms often operate in tandem in a linked parallelogram arrangement and perform useful work by means of attached implements such as a bucket, scoop, plow, fork, or the like. It is often desirable to change implements and, for this purpose, quick couplers have been developed. Such coupler systems employ a male master mounted on the upper and lower arms of a front end loader adapted for mating engagement with female couplers attached to the various implements. Incorporated herein by reference is U.S. Pat. No. 4,708,579, which fully discloses a hydraulically or manually actuated implement coupler for front end loaders.

A shortcoming of prior systems, especially those using a fork-type implement, is that the object to be engaged cannot be seen by the operator of the front end loader. Often, even the forks themselves are obscured from view by the framework of the implement. Such shortcomings give rise to inefficient operation of the front end loader with such implements by slowing such operations. Additionally, with the operator blinded by the implement itself, damage to items being manipulated by the fork is an ever-present possibility, as is damage to surrounding structure. Accordingly, there is a need in the an for maintaining the strength and durability of present coupler designs, while allowing the operator of the front end loader to see the object to be engaged by the fork or other implement, thus greatly increasing the ease of use of the front end loader with a fork or other similar type attachment while preventing damage to the item to be manipulated.

Since the operator of a front end loader is normally seated behind the coupler and, in normal operations, must look through the coupler to see the load to be engaged by the implement, such as when loading palletized materials with forks, there is a need in the art for a coupler which maximizes visibility to the load and coupler by removing structural members from the required line of sight as much as possible, while maintaining structural integrity. The instant invention provides such a coupler.

SUMMARY OF INVENTION

Thus, it is a general aspect of the invention to allow operators of front end loaders to see the items to be lifted by a fork or other similar type implement.

A further aspect of the invention is to provide a coupler for a front end loader that is safe, reliable, easy-to-use, and which has characteristics similar to those of other quick couplers.

Yet another aspect of the invention is to provide a quick coupler for front end loader implements that is made from conventional materials, can be produced at reasonable costs, and adapted for implementation with a wide variety of front end loaders and implements.

The foregoing and other objects and advantages of the invention, which will be made more apparent as the specification proceeds, are achieved by a high visibility coupler for a front end loader comprising: means for mounting a high visibility coupler upon a front end loader; and means for receiving an implement upon the coupler, said coupler having a lattice type structure such that an operator of the front end load may see any object to be engaged by the implement.

BRIEF DESCRIPTION OF THE DRAWINGS

Reference is now made to the accompanying drawings, wherein.

When referring to elements shown in the drawings and referred to in the specification, corresponding numerals are used to facilitate comparison therebetween.

PREFERRED EMBODIMENT FOR CARRYING OUT THE INVENTION

Figure 1:
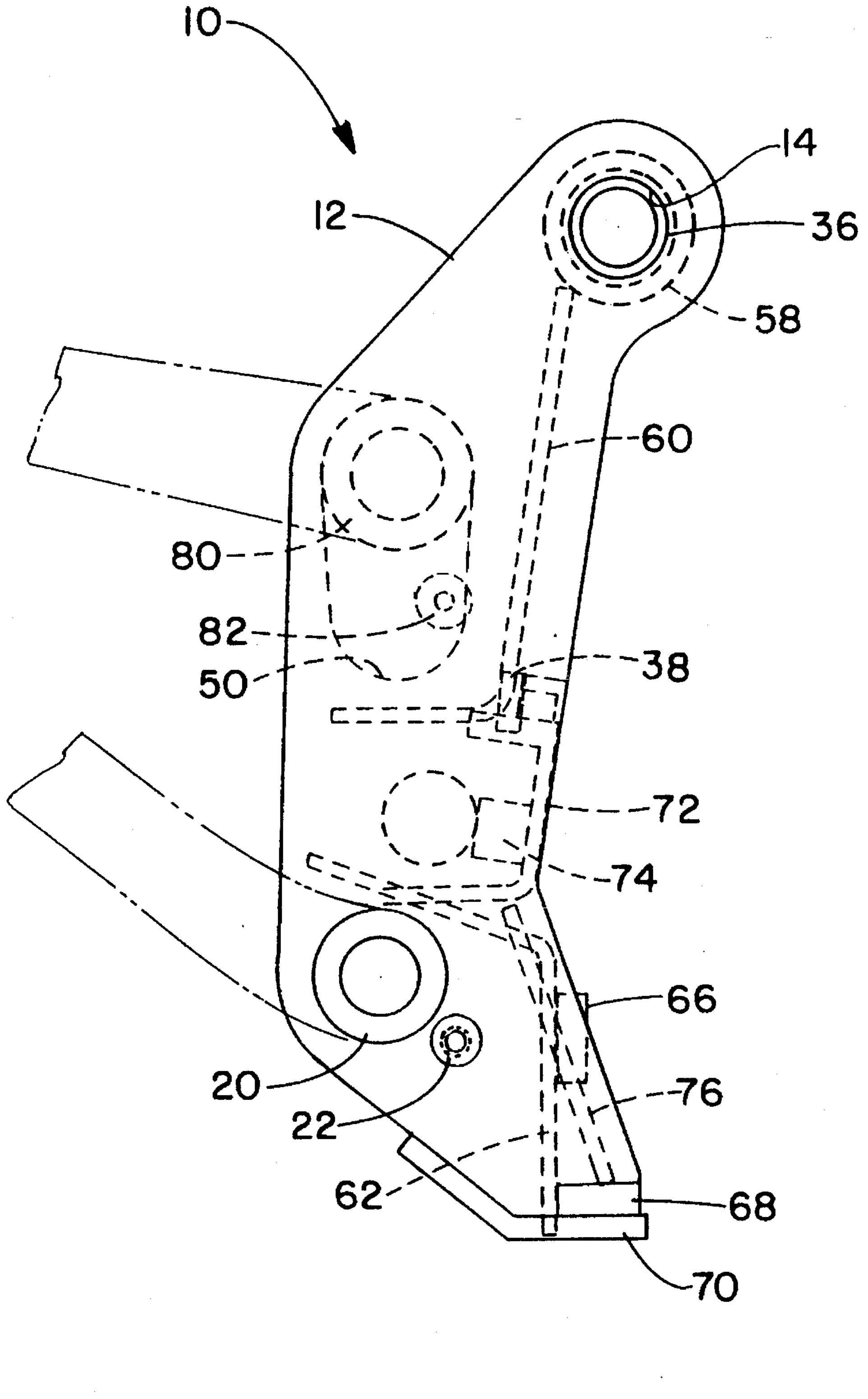
FIG. 1 is a side elevational view of the high visibility coupler portion attached to the loading ends of an upper and lower pair of front end loader arms (remainder of arms and of loader are not shown)
Figure 2:
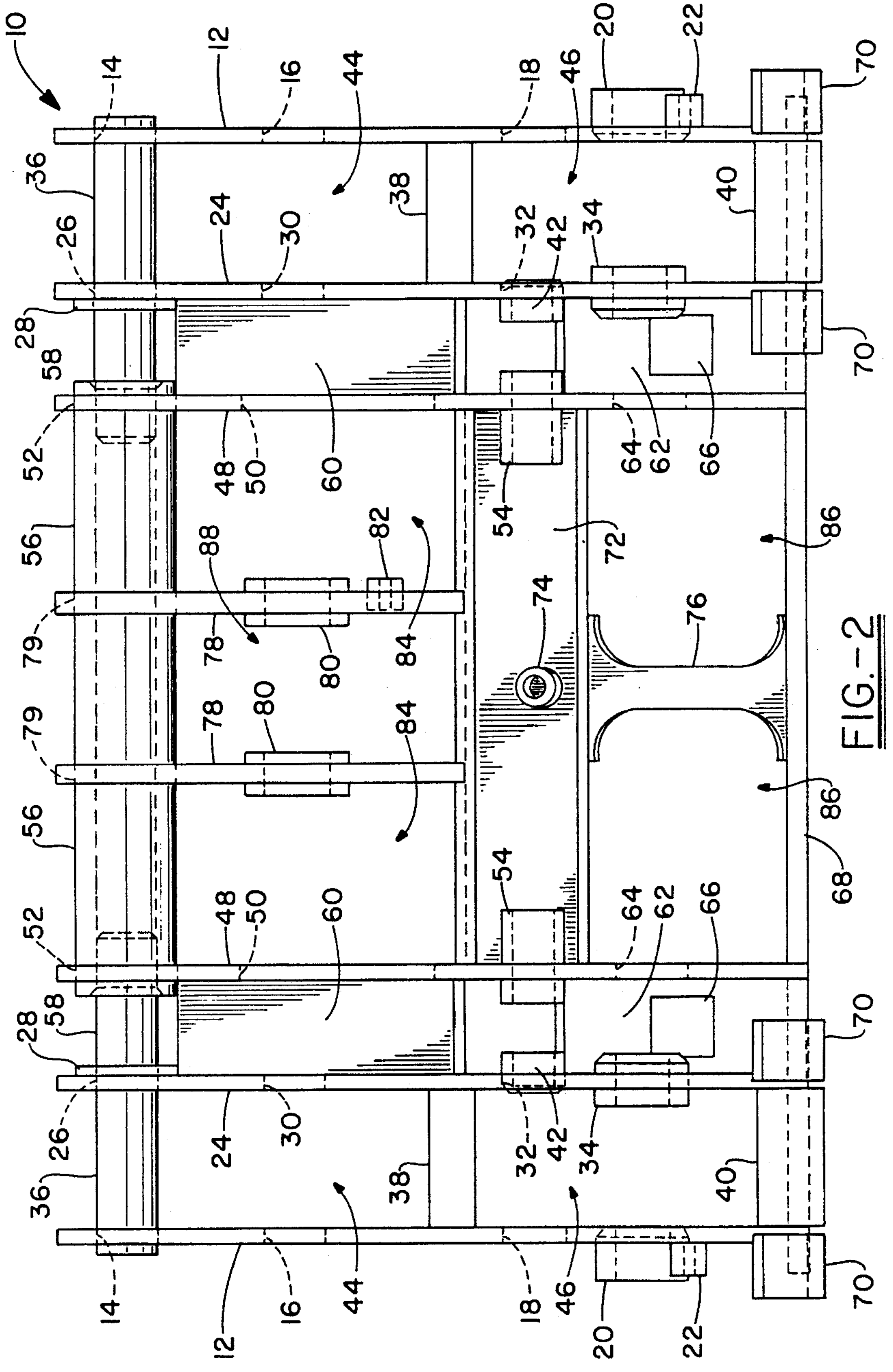
FIG. 2 is a rear elevational view of the high visibility coupler portion.

Reference now is particularly made to the details of the structure shown in the drawings. The male portion of a high visibility coupler is designated generally as numeral 10. As can be seen in FIGS. 1 and 2, the coupler 10 comprises a pair of outer lift ribs 12, each having at its top end an outer coupling pin hole 14, first and second outer guide holes 16 and 18, respectively in the middle portion, and an outer lift rib boss 20 extending outwardly at the bottom thereof. A lift rib round nut 22 is located slightly below each outer lift rib boss 20. It will be appreciated that the ribs 12 are typically of steel plate construction.

Referring now to FIG. 2, a pair of inner lift ribs 24, that are substantially parallel to the outer lift ribs 12, have an inner coupling pin hole 26 aligned with the outer coupling pin hole 14, with a coupling pin boss 28 on the inner side of each inner lift rib. Each inner lift rib 24 also has first and second inner guide holes 30 and 32, respectively, substantially aligned with the first and second outer guide holes 16 and 18, and an inner lift rib boss 34 that is substantially aligned with outer lift arm boss 20. The outer lift ribs 12 are securably and perpendicularly interconnected to their corresponding inner lift ribs 24 at their tops by a pair of coupling pins 36 through the coupling pin holes 14 and 26. The outer lift ribs 12 are also securably and perpendicularly interconnected to their corresponding inner lift ribs 24 at their mid-portions by a roll back bar 38 and at their bottoms by a dump stop bar 40. The inner lift ribs 24 also have a plunger boss 42 that extends inwardly and is securably connected to the second inner guide hole 32. Like the outer lift ribs 12, the inner ribs 24, the roll back bars 38 and the dump stop bars 40 are typically of steel plate construction.

As seen in FIG. 2, it should be appreciated that the outer and inner lift ribs 12, 24, the coupling pins 36, and the stop roll back bar 38 form an opening 44. In a similar fashion, the stop roll back bar 38, the dump stop bar 40, and the lift ribs 12, 24 form an opening 46.

Substantially parallel to the inner lift ribs 24 are a pair of plunger ribs 48, each having a plunger rib slot 50 in its upper half that is substantially aligned with the first pair of outer and inner guide holes 16 and 30, the plunger ribs also have a pair of cross tube holes 52 that are substantially aligned with the coupling pin holes 14 and 26, and a plunger housing 54 that is substantially aligned with the plunger boss 42 of each inner lift rib 24. The plunger ribs 48 are securably and perpendicularly interconnected at their tops by a cross tube 56, which is securably connected inside the cross tube holes 52. A bridge pin 58 is securably interconnected to the ends of the cross tube 56. The plunger ribs 48 are also securably connected to inner lift ribs 24 by a top plate 60, which is between the bridge pin 58 and the plunger housing 54, and by a bottom plate 62, which is between the plunger housings 54 and the bottoms of the plunger ribs 48 and inner lift ribs. The plunger ribs 48 also have a plunger guide hole 64 that is substantially aligned with the outer and inner lift arm bosses 20 and 34. There may also be a stop bearing plate 66 securably connected to the bottom plate 62 or the top plate 60. Typically, the plunger ribs 48, the top plate 60, and the bottom plate 62 are of steel plate construction.

The respective bottom ends of the inner and outer lift ribs 12 and 24, and the plunger ribs 48 are securably and perpendicularly interconnected to a bottom bar 68. There may be a plurality of skid plates 70 strategically placed on the underside of the bottom bar 68 and connected to the ribs 12, 24, 48 to alleviate wear and tear. A cylinder mount plate 72 joins the plunger ribs 48 at their mid-portions, with a cylinder mount boss 74 somewhere near its center. The bottom of the cylinder mount plate 72 may be securably connected to the top of the bottom bar 68 by a middle brace 76.

A pair of dumplink ribs 78 are substantially parallel to the plunger ribs 48, and have a pair of substantially aligned cross tube holes 79 that are securably and perpendicularly interconnected to the cross tube 56. The dumplink ribs 78 extend downwardly and are securably attached to the top of the cylinder mount plate 72. The dumplink ribs 78 have a corresponding set of dumplink bosses 80, that are substantially aligned with the plunger rib slot 50 and the first outer and inner guide holes 16 and 30. One of the dumplink ribs 78 has a dumplink round nut 82 located slightly below only one of the dumplink bosses 80. It will be appreciated that the bottom bar 68, the cylinder mount plate 72, the middle brace 76, and the dumplink ribs 78 are of steel plate construction.

Referring still to FIG. 2, as those skilled in the art will appreciate, the plunger ribs 48, the dumplink ribs 78, the cross tube 56, and the cylinder mount plate 72 form openings 84. Likewise, the dumplink ribs 78, the cylinder mount plate 72, and the bottom bar 68 form an opening 86. The opening 86 may be intersected by the middle brace 76. Finally, the dumplink ribs 78, the cross tube 56 and the cylinder mount plate 72 form an opening 88. Thus, the aforementioned openings 44, 46, 84, 86 and 88 provide clear sight lines for the object to be engaged by an implement, such as a fork.

Although any method of attaching and detaching a coupler 10 to a front end loader may be utilized, the plurality of bosses 20, 34, 80 and 74, located on the outer lift ribs 12, inner lift ribs 24, dumplink ribs 78 and cylinder mount plate 72 respectively, comprise one possible method of mounting the high visibility coupler 10 to a front end loader. It should further be appreciated that the lift arms (not shown) of the front end loader are received between the outer lift arm boss 20 and the inner lift arm boss 34 and are detachably mounted thereto. In a similar fashion, the dumplink arm (not shown) of the front end loader is received by the dumplink bosses 80 and is detachably mounted thereto. Furthermore, the operator of the front end loader can control, usually by hydraulics, the operation of the lift arms and dumplink arm so that the high visibility coupler 10 may be pivotally maneuvered at either detachable mounting to manipulate the attached implement.

Additionally, although any method of attaching and detaching an implement to the coupler 10 may be utilized, the plurality of bosses 42 and 54 located on the inner lift ribs 24 and plunger ribs 48 respectively, in cooperation with the bridge pin 58 between the inner lift ribs 24 and plunger ribs 48, comprise one possible method of engagement for affixing an implement to the high visibility coupler 10. As those skilled in the art will appreciate, a pair of hooks (not shown) integral with an implement will be mountably supported and received by the bridge pins 58. Furthermore, the implement will have protruding eyes (not shown) that are detachably mounted by engagement with plunger pins passing through said eyes and between the plunger boss 42 and plunger housing 54. Of course, the use of such manually or hydraulically actuated plunger pins to engage and secure and implement to a coupler is well known. Thus, with the implement mountably received upon the high visibility coupler 10, the operator of the front end loader may more easily control the movement of the implement.

Therefore, in actual operation, once the high visibility coupler 10 has been attached to a front end loader, with any typical implement mounted thereto, the implement may be controlled by the operator in a manner well known in the art. The benefit of the present invention resides in the numerous openings 44, 46, 84, 86 and 88 that are provided by the lattice type structure of the coupler 10. These openings 44, 46, 84, 86 and 88 allow the operator of the front end loader to clearly visualize the objects, such as pallets or equipment, to be engaged by the attached implement. The benefits of the coupler 10 described herein quickly become apparent. Objects to be engaged are less likely to be damaged by the implement being used, and accordingly, the operator will be more productive and time efficient while utilizing the high visibility coupler. Furthermore, the structure of the coupler 10 is such that the strength thereof is maintained for engaging and lifting heavy loads.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the appended claims.

What is claimed is:

1. A high visibility coupler for a front end loader, comprising:

means for mounting a high visibility coupler upon a front end loader;

means for receiving an implement upon the coupler; and a lattice type structure including a plurality of substantially parallel outer lift ribs, inner lift ribs, plunger ribs and dumplink ribs, wherein a pair of coupling pins perpendicularly interconnect said outer lift ribs and said inner lift ribs, a cross tube perpendicularly interconnects said plunger ribs and said dumplink ribs, said cross tube receiving at each end a bridge pin to perpendicularly interconnect said inner lift ribs and said plunger ribs, and a cylinder mount plate perpendicularly interconnects said plunger ribs and said dumplink ribs, and wherein said outer lift ribs, said inner lift ribs, said plunger ribs, said dumplink ribs, said cross tube, said bridge pins and said cylinder mount plate define a plurality of visual openings therebetween, such that an operator of the front end loader may see objects to be engaged by the implement, said means for receiving and said means for mounting carried by said lattice type structure.

2. A high visibility coupler according to claim 1, wherein said means for mounting comprises a plurality of mounting bosses integrally disposed on said lattice type structure, said mounting bosses selectively receiving a corresponding number of lift arms extending from the front end loader.

3. A high visibility coupler according to claim 2, wherein said means for receiving comprises said pair of bridge pins and a pair of plunger receiving bosses integrally disposed on said plunger ribs, said bridge pins adapted for receiving a corresponding pair of hooks integral with the implement, and said plunger receiving bosses adapted for selectively receiving protruding eyes integral with the implement.

4. A high visibility coupler according to claim 3, wherein said lattice type structure further comprises:

a bottom bar that perpendicularly interconnects said outer lift ribs, inner lift ribs, and plunger ribs;

a stop roll back bar and a stop dump bar that perpendicularly interconnects said outer lift ribs and said inner lift ribs; and a top plate and a bottom plate that perpendicularly interconnects said inner lift ribs and said plunger ribs.

5. A high visibility coupler according to claim 4, wherein said plurality of visual openings are formed among the structures of:

said outer and inner lift ribs, said coupling pins and said stop roll back bar;

said outer and inner lift ribs, said stop roll back bar and said bottom bar;

said plunger ribs, said dumplink ribs, said cross tube and said cylinder mount plate;

said plunger ribs, said cylinder mount plate and said bottom bar; and said dumplink ribs, said cross tube and said cylinder mount plate.

6. The coupler according to claim 5, wherein a plurality of skid plates are affixed to the underside of said bottom bar.

7. The coupler according to claim 6, wherein a middle brace is securably connected between the bottom of said cylinder mount plate and the top of said bottom bar.

8. The coupler according to claim 7, wherein a plurality of stop bearing plates are securably connected to said bottom plates.

9. A high visibility coupler for a front end loader, comprising:

a pair of outer lift ribs each having a first and second outer guide hole and an outer coupling pin hole passing therethrough, the outer lift ribs also having an outer lift rib boss securably attached thereon, with a lift rib round nut below said outer lift rib boss;

a pair of inner lift ribs which are substantially parallel with an inner side of said outer lift ribs, each inner lift rib having a first and second inner guide hole passing therethrough that is substantially aligned with said first and second outer guide holes of said outer lift rib, said inner lift ribs having an inner coupling pin hole passing therethrough substantially aligned with said outer coupling pin hole, said inner lift ribs having on their inner sides a coupling pin boss that is aligned with said inner coupling pin hole, said inner lift ribs having a plunger boss inwardly extending from said second guide hole, and an inner lift rib boss substantially aligned with said outer lift rib boss, the outer and inner lift ribs securably connected to each other by a roll back bar at their mid-portion and by a dump stop bar at their bottoms;

a pair of plunger ribs, which are substantially parallel with an inner side of said inner lift ribs, each having a plunger rib slot therethrough that is substantially aligned with said first outer and inner guide holes, said plunger ribs having a plunger housing that is substantially aligned with said second outer and inner guide holes and said plunger boss, the top of said plunger ribs having a cross tube hole therethrough which is substantially aligned with said outer and inner coupling pin holes, said plunger ribs being securably connected to their closest respective inner lift ribs by a top plate, a bottom plate, and a bridge pin, said plunger ribs being securably connected to each other by a cross tube, which is securably connected within said cross tube holes at their top ends, and by a cylinder mount plate at their respective mid-portions, said plunger ribs also having a plunger guide hole substantially aligned with said outer and inner lift rib bosses;

a bottom bar securably connected to said outer and inner lift ribs and said plunger ribs at their respective bottoms;

a pair of coupling pins securably connected through said outer and inner coupling pin holes;

a cylinder mount boss securably connected to said cylinder mount plate; and a pair of dumplink ribs which are substantially parallel with an inner side of said plunger ribs, the top ends of said dumplink ribs are securably connected to said cross tube, said dumplink ribs being securably connected to the cylinder mount plate at their bottom ends, said dumplink ribs each having a dumplink boss that is aligned with said plunger rib slot and said first inner and outer lift rib guide holes.

10. The coupler according to claim 9, wherein said high visibility coupler has a plurality of visual openings formed among:

said outer and inner lift ribs, said coupling pins and said stop roll back bar;

said outer and inner lift ribs, said stop roll back bar and said bottom bar;

said plunger ribs, said dumplink ribs, said cross tube and said cylinder mount plate;

said plunger ribs, said cylinder mount plate and said bottom bar; and said dumplink ribs, said cross tube and said cylinder mount plate.

11. A high visibility coupler according to claim 10, wherein said outer and inner lift rib bosses and said dumplink bosses selectively receive a corresponding number of lift arms extending from the front end loader.

12. A high visibility coupler according to claim 11, wherein a pair of bridge pins perpendicularly interconnect each said inner lift rib to a corresponding plunger rib, said bridge pins adapted to receive a corresponding pair of hooks integral with an implement, and said plunger receiving bosses selectively receiving protruding eyes integral with the implement.

* * * * *